Patented Oct. 10, 1950

2,525,584

UNITED STATES PATENT OFFICE 2,525,584

PRODUCTION OF PYRROLIDINE

Charles A. Bordner and Charles G. Kamin, Niagara Falls, N. Y., assignors to E. I. du Pont de Nemours & Company, Wilmington, Del., a corporation of Delaware No Drawing. Application June 18, 1948, Serial No. 33,926

2 Claims. (Cl. 260—313)

This invention relates to the production of pyrrolidine and piperidine, particularly by vapor phase reactions of tetrahydrofuran and of tetrahydropyran with ammonia.

Yur'ev and Prokina (C. A. 32, 548 (1938)) obtained pyrrolidine in a 43% yield by passing tetrahydrofuran in a stream of ammonia over alumina at 400° C. Yur'ev et al. (C. A. 33, 779 (1939)) obtained piperidine in a 20% yield by a similar method at 400–430° C. It is an object of this invention to provide improvements in the above methods whereby by-product formation is greatly decreased, the conversion to and yield of pyrrolidine or of piperidine are greatly increased, and the methods are rendered commercially attractive. Other objects will be apparent from the ensuing description.

The above objects are accomplished in accordance with the invention by effecting the reaction of tetrahydrofuran or tetrahydropyran with ammonia in the vapor phase in the presence of a gamma alumina dehydration catalyst. Such a catalyst has been found to give much higher conversions to and yields of pyrrolidine or piperidine at any temperature suitable for the reaction than does alpha type alumina catalyst and at substantially lower temperatures. The use of a substantial excess of ammonia is highly beneficial and best results, particularly when preparing pyrrolidine, follow the use of the gamma type catalyst with an excess of ammonia at relatively low temperatures while recycling high boiling by-products of the reaction. Under the preferred conditions conversions of tetrahydrofuran to pyrrolidine on the order of 60–70% and yields on the order of 70–78% may be readily obtained. Similarly, yields of piperidine on the order of 55–60% may be obtained from tetrahydropyran with good conversions.

The low yields of pyrrolidine resulting from the use of alpha alumina catalyst are due primarily to the formation of excessive amounts of both low and high boiling by-products. The chief low boiling product is butadiene which results from the dehydration of tetrahydrofuran alone whereby the ring structure is broken, whereas the desired production of pyrrolidine results from a dehydration reaction involving both tetrahydrofuran and ammonia whereby the oxygen atom in the ring is replaced by a nitrogen atom according to the following equation:

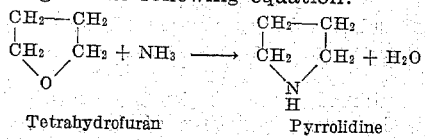

The high boiling by-products apparently result from condensation reactions involving pyrrolidine.

When employing the alpha type alumina catalyst for the pyrrolidine reaction, relatively high temperatures, e. g., around 400° C., are generally necessary in order to effect conversion to pyrrolidine at a reasonable rate. However, at such temperatures, formation of low boiling by-product materials, chiefly butadiene, is excessive and the yields of pyrrolidine are correspondingly poor. It has been discovered that when employing the gamma type alumina as catalyst good conversion to the desired product can be obtained at substantially lower temperatures at which formation of by-product butadiene is slight with the result that the yields are greatly improved. Furthermore, even at the same temperatures, conversion to and yields of pyrrolidine are substantially improved when employing the present catalyst. In general, temperatures of 275–375° C. and preferably 290–340° C. will be employed. Under the preferred temperature conditions loss of product due to low boiler formation is slight and yields of the desired product are correspondingly increased.

The relative effectiveness of alpha and gamma types of alumina dehydration catalysts for the pyrrolidine reaction are indicated by the results of the examples reported in Table 1. In all of the examples the abbreviation "THF" means tetrahydrofuran and all molar quantities represent gram moles.

In each example, the reactor consisted of an upright electrically heated 1.5" diameter iron pipe, 60" long provided with an inner thermocouple well. About 913 cc. of 2–4 mesh alpha catalyst or 8–14 mesh gamma catalyst was placed between upper and lower 15 in. sections of porcelain pieces. The upper of such sections served as a vaporizer and preheater. The catalyst was activated for use by passing a stream of air through it at a temperature of about 550–600° C. until all carbonaceous deposits from previous runs were burned out as indicated by the disappearance of all hot spots. Feed tubes were provided for delivering the reactants to the top of the reactor and a tube was provided at the bottom for connecting the reactor with a recovery system consisting of an ice-cooled receiver connected through a water-cooled reflux condenser to two traps cooled by a trichloroethylene-solid carbon dioxide bath. The last trap was vented to the atmosphere.

In starting a run, a stream of ammonia was passed through the reactor until the desired temperature conditions were reached. The required amount of tetrahydrofuran was then fed along with the ammonia. At the end of the run, the ammonia was allowed to flow for a time after the tetrahydrofuran feed was discontinued. Pyrrolidine was isolated from the mixture of reaction products by known distillation methods after first stripping off ammonia and low boiling materials and then drying the remaining product.

TABLE 1

| Example | 1 | 2 | 3 | 4 |
|---|---|---|---|---|
| Type of alumina | alpha | alpha | gamma | gamma |
| Time, min | 361 | 279 | 288 | 256 |
| Temp., °C | 335–345 | 360–370 | 350–360 | 305–310 |
| Moles THF fed | 16.7 | 16.7 | 12.5 | 12.5 |
| Moles NH$_3$/mole THF | 7.94 | 7.92 | 7.97 | 6.86 |
| Mole of mixt./L. cat./min | 0.452 | 0.442 | 0.447 | 0.433 |
| Low boilers, g.[1] | 196(147) | 177(132) | 82 | 20 |
| High boilers, g.[1] | 354(265) | 262(196) | 115 | 164 |
| Conv. to pyrrolidine, per cent | 20.8 | 40.7 | 54.4 | 60.4 |
| Yield of pyrrolidine, per cent | 27.3 | 43.1 | 54.6 | 65.3 |
| Kg. pyrrolidine/L. cat./day | 1.06 | 2.01 | 2.63 | 3.31 |

[1] The values shown in parenthesis for Examples 1 and 2 are calculated values for feeds of 12.5 moles of THF so as to be comparable with the values for Examples 3 and 4.

It will be noted that the conversions and yields for Examples 1 and 2, in which the alpha catalyst was used, were distinctly inferior to the corresponding values for the other examples in which gamma catalyst was used. Also by-product formation was high in Examples 1 and 2 and relatively low in Examples 3 and 4. Also noteworthy are the high conversions and yields even at the low temperature of 305–310° C. when using gamma catalyst in Example 4.

The effect of varying the temperature when using the gamma type catalyst is further indicated from the results of the examples of the following Table 2, Examples 3 and 4 of which are the same as Examples 3 and 4 of Table 1. In all of these examples about 7–8 moles of ammonia were fed per mole of tetrahydrofuran, the mixture of reactants was fed at rates within the range 0.4–0.6 mole per liter of catalyst per minute and a total of 12.5 moles of tetrahydrofuran were fed in each.

TABLE 2

| Example | 3 | 5 | 4 | 6 | 7 |
|---|---|---|---|---|---|
| Time, min | 288 | 284 | 256 | 298 | 284 |
| Temp. °C | 350–360 | 330–345 | 305–310 | 295–300 | 280–290 |
| Low boilers, g | 82 | 75 | 20 | 3 | 4 |
| High boilers, g | 115 | 115 | 164 | 153 | 141 |
| Conv. to pyrrolidine, per cent | 54.4 | 61.2 | 60.4 | 53.1 | 45.2 |
| Yield of pyrrolidine, per cent | 54.6 | 61.5 | 65.3 | 65.4 | 63.1 |

The above results show that in the temperature range 290–360° C., an increase in temperature in general increases low boiler formation while the conversion to and yield of pyrrolidine, as well as high boiler formation increase to maximum values and then decrease somewhat. The same general trends were noted in similar runs wherein 2 moles of ammonia were fed per mole of tetrahydrofuran.

The beneficial effects of using a large excess of ammonia are demonstrated by the results of the examples shown in the following Table 3. In each of these examples a gamma type catalyst was used, the temperature was in the range 295–320° C., the mixture of reactants was fed at a rate within the range of about 0.39–0.47 mole per liter of catalyst per minute and a total of 12.5 moles of tetrahydrofuran were fed.

TABLE 3

| Example | 8 | 9 | 4 | 6 | 10 |
|---|---|---|---|---|---|
| Time, min | 97 | 201 | 256 | 298 | 454 |
| Moles NH$_3$/mole THF | 2 | 5 | 6.86 | 8 | 12 |
| Low boilers, g | 8 | 4 | 20 | 3 | 26 |
| High boilers, g | 214 | 185 | 164 | 153 | 133 |
| Conv. to pyrrolidine, per cent | 28.9 | 42.6 | 60.4 | 53.1 | 71.4 |
| Yield of pyrrolidine, per cent | 41.2 | 54.2 | 65.3 | 65.4 | 71.8 |
| Kg. pyrrolidine/L. cat./day | 4.17 | 2.95 | 3.31 | 2.49 | 2.2 |

The above results show that with relatively fixed conditions of temperature and mixture feed rate, an increase in the ammonia fed increases the conversion and decreases high boiler formation. It has been found that at least 1 mole of ammonia per mole of tetrahydrofuran should generally be used, although an excess of ammonia, e. g. at least 3 and preferably 6–20 moles per mole of tetrahydrofuran, is recommended. Much larger amounts of ammonia, e. g. up to 40–50 moles per mole of tetrahydrofuran may be employed if desired, but such large excesses generally merely complicate recovery operations without contributing any compensating advantages.

Example 11

Example 10 of Table 3 was repeated except that the mixture of reactants, in the same quantities, was fed at the rate of 0.848 instead of 0.39 mole per liter of catalyst per minute. By thus decreasing the contact time by 56%, there resulted a 98% increase in the space time yield whereas the conversion to and yield of pyrrolidine decreased only from values of 71.4 to 65.3% and from 71.8 to 70.0%, respectively.

Insofar as conversion and yield are concerned, the time of contact is not especially critical and may be varied over wide limits. In general, contact times corresponding to feeds of tetrahydrofuran within the range of 0.1–1.0 mole per liter of catalyst per minute give good results, particularly when 6–20 moles of ammonia are fed per mole of tetrahydrofuran.

The effect of reaction variables upon the composition of the high boilers has not been completely investigated. However, an increase in reaction temperature above about 325° C. appears definitely to decrease the formation of high boilers in the pyrrolidine reaction. It is not preferred, however, that temperatures above about 340° C. be employed with the object of minimizing high boiler formation, since at such temperatures, the formation of low boiling by-products is generally excessive. It has been discovered that the net yield of pyrrolidine may be increased substantially by recycling the high boilers, the increase being due apparently to the conversion of high boiler products, or part thereof, to pyrrolidine. Accordingly, the preferred procedure involves operating at temperatures at which low boiler formation is relatively slight, e. g. at 290–340° C. while recycling the high boiler products.

The effect of recycling high boilers from the pyrrolidine reaction is indicated by the results shown in the following Table 4. In Examples 4, 11 and 10, nothing was recycled whereas in Examples 12, 13 and 14, the high boilers obtained in Examples 4, 11 and 10, respectively, were added to the feeds and recycled. In each of these examples a gamma alumina catalyst was used and a total of 12.5 moles of tetrahydrofuran were fed. The amounts of high boilers fed in Examples 12, 13 and 14 were disregarded in calculating the conversions and yields reported.

TABLE 4

| Example | 4 | 12 | 11 | 13 | 10 | 14 |
|---|---|---|---|---|---|---|
| Temp., °C | 305–310 | 305–315 | 310–320 | 310–325 | 310–320 | 310–320 |
| Moles NH₃/Mole THF | 6.86 | 10.1 | 12.1 | 13.2 | 12 | 12.8 |
| Moles of mixt./L. cat./min | 0.433 | 0.423 | 0.848 | 0.841 | 0.39 | 0.431 |
| Low boilers, g | 20 | 64 | 16 | 16 | 26 | 39 |
| High boilers, g | 164 | 200 | 138 | 172 | 133 | 153 |
| Conv. to pyrrolidine, per cent | 60.4 | 76.0 | 65.3 | 65.8 | 71.4 | 74.3 |
| Yield of pyrrolidine, per cent | 65.3 | 77.7 | 70.0 | 74.0 | 71.8 | 75.2 |

The pyrrolidine reaction, accordingly, will in general be carried out in accordance with the invention using the gamma catalyst at a temperature of about 275–375° C. employing at least one mole of ammonia per mole of tetrahydrofuran. The preferred temperature range is 290–340° C. and best results follow the use of at least 3 and preferably 6–20 moles of ammonia per mole of tetrahydrofuran while recycling the high boiling products. Contact time will generally correspond to a feed of tetrahydrofuran within the range of 0.1–1.0 mole per liter of catalyst per minute.

The conditions suitable for carrying out the piperidine reaction are in general similar to those noted above except that the temperature ranges are somewhat narrower and the recycling of high boilers is not as advantageous as in the case of the pyrrolidine reaction. Suitable temperatures are within the range 300–375° C. and preferably 310–360° C. Temperatures outside the broader range may be used, but conversion is low below 300° C. and by-product formation is excessive above 375° C. The following Table 5 shows the results of examples of the production of piperidine under various conditions employing the same equipment and general technique described previously for the production of pyrrolidine. In the table, "THP" stands for tetrahydropyran. In all these examples a gamma alumina catalyst was used.

TABLE 5

| Example | 15 | 16 | 17 | 18 |
|---|---|---|---|---|
| Temp., °C | 285–295 | 315–325 | 340–350 | 380–410 |
| Time, Min | 261 | 240 | 220 | 240 |
| Moles THP fed | 6.97 | 6.97 | 6.97 | 6.97 |
| Moles NH₃/mole THP | 15.8 | 13.85 | 13.38 | 13.85 |
| Moles of Mixt./L. Cat./Min | 0.489 | 0.46 | 0.495 | 0.46 |
| Low boilers, g | 1 | 5 | 15 | 31 |
| High boilers, g | 99 | 144 | 107 | 273 |
| Conv. to piperidine, per cent | 17.6 | 47.2 | 57.1 | 8.3 |
| Yield of piperidine, per cent | 44.0 | 58.0 | 59.0 | 8.3 |
| Kg. piperidine/L. Cat./Day | 0.632 | 1.84 | 2.42 | 0.321 |

The high boilers obtained from the pyrrolidine reaction consist chiefly of two compounds, one of which is N-n-butylene pyrrolidine and the other an unidentified material boiling at 167–169° C. at 50 mm. The high boilers generally consist of about 60–70% of the former and 10–25% of the latter.

N-n-butylene pyrrolidine, which may also be called 1-n-butylene pyrrolidine, boils at 154° C. at atmospheric pressure. Upon analyses by standard methods, the following values were found:

| | Found | Theory for N-n-butylene Pyrrolidine |
|---|---|---|
| Carbon, per cent | 76.02 | 76.72 |
| Hydrogen, per cent | 11.75 | 12.09 |
| Nitrogen, per cent | 11.27 | 11.9 |
| Neutralization Equivalent | 126.3 | 125.1 |

The compound forms a picrate which melts at 97° C. After hydrogenation it forms a picrate melting at 123–124° C. as compared with a melting point of 124° C. for the known picrate of N-n-butyl pyrrolidine. The above picrates were prepared by dissolving 0.2 g. of the material in 4 cc. of hot 95% ethanol and mixing the resulting solution with a hot solution of 0.4 g. of picric acid in 4 cc. of 95% ethanol. Upon cooling the picrate crystallized out, after which it was filtered, washed with ethanol and dried. N-n-butylene pyrrolidine may be employed as an intermediate in the preparation of other chemical compounds. Thus it may be hydrogenated to yield the N-n-butyl pyrrolidine which is useful as an insecticide (U. S. Patent 1,748,633).

In practicing the invention, it will be convenient to employ the gamma alumina catalyst in granular form, e. g. as about 2–14 mesh material. The life of the catalyst appears to be indefinite if it is periodically reactivated. Reactivation may be effected simply by passing a stream of air through the catalyst while maintaining the bed of material at a temperature of about 500–600° C. until all hot spots disappear. The purpose of the reactivation treatment is to burn off carbonaceous deposits.

Pyrrolidine and piperidine are useful as intermediates for the production of various pharmaceuticals, insecticides and rubber accelerators.

We claim:

1. A method of preparing pyrrolidine comprising reacting tetrahydrofuran in the vapor phase with ammonia in the presence of a gamma alumina dehydration catalyst at a temperature of 275–375° C., employing 6–20 moles of ammonia per mole of tetrahydrofuran, separating pyrrolidine and the high boiling by-products from the resulting product mixture and recycling said high boiling by-products.

2. A method of preparing pyrrolidine comprising reacting tetrahydrofuran in the vapor phase with ammonia in the presence of a gamma alumina dehydration catalyst at a temperature of 290–340° C., employing 6–20 moles of ammonia per mole of tetrahydrofuran, separating pyrrolidine and the high boiling by-products from the resulting product mixture and recycling said high boiling by-products.

CHARLES A. BORDNER.
CHARLES G. KAMIN.

REFERENCES CITED

The following references are of record in the file of this patent:

UNITED STATES PATENTS

| Number | Name | Date |
|---|---|---|
| 2,415,061 | De Simo et al. | Jan. 28, 1947 |

FOREIGN PATENTS

| Number | Country | Date |
|---|---|---|
| 554,889 | Great Britain | July 23, 1943 |
| 563,636 | Great Britain | Aug. 23, 1944 |

OTHER REFERENCES

Sabatier: Catalysis in Organic Chemistry, Van Nostrand. N. Y., 1923, page 232 (paragraph 651).

Alekseevski: Chem. Abstracts, vol. 24, (1930), page 4442.

V. Braun et al.: Chem. Abstract, vol. 31 (1937), pp. 4961-4963.

Yur'ev et al.: Jour. Gen. Chem. (USSR), vol. 7 (1937), pp. 1868-1873 (abstracted Chem. Abstracts, vol. 32 (1938), p. 548).

Yur'ev et al.: Jour. Gen. Chem. (USSR), vol. 9 (1939), pp. 590-594 (abstracted Chem. Abstracts, vol. 33 (1939), p. 7779).

Bentley et al.: Jour. Chem. Soc. Ind., Trans. 64 (1945), pp. 148-149.

Wilson: Jour. Chem. Soc. (London) (1945), pages 63-64.

Feachem et al.: Jour. Chem. Soc. (London) (1948), pages 267-272.